US008204499B2

(12) United States Patent
Rahman et al.

(10) Patent No.: US 8,204,499 B2
(45) Date of Patent: Jun. 19, 2012

(54) DETERMINING MOBILE STATION OPERATING COUNTRY TO ENABLE SYSTEM SELECTION OR OTHER LOCATION BASED DEVICE FEATURES WITHOUT NETWORK ASSISTANCE

(75) Inventors: Iftekhar Rahman, Billerica, MA (US); Kyriaki Konstantinou, New York, NY (US); Gordana Guranovic, Piscataway, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 210 days.

(21) Appl. No.: 12/636,240

(22) Filed: Dec. 11, 2009

(65) Prior Publication Data
US 2011/0143753 A1 Jun. 16, 2011

(51) Int. Cl.
H04W 4/00 (2009.01)
(52) U.S. Cl. .................... 455/432.1; 455/552.1
(58) Field of Classification Search ........... 455/432.1, 455/552.1; 709/224, 229
See application file for complete search history.

(56) References Cited

U.S. PATENT DOCUMENTS

| 2001/0027108 | A1* | 10/2001 | Sumino ................... 455/456 |
|---|---|---|---|
| 2002/0154632 | A1 | 10/2002 | Wang et al. |
| 2005/0282544 | A1 | 12/2005 | Oommen et al. |
| 2006/0282554 | A1* | 12/2006 | Jiang et al. ............... 710/14 |
| 2008/0182615 | A1* | 7/2008 | Xue et al. ............. 455/552.1 |
| 2009/0124291 | A1 | 5/2009 | Cha |
| 2009/0149220 | A1 | 6/2009 | Camilleri et al. |

FOREIGN PATENT DOCUMENTS

| EP | 2 094 057 A2 | 8/2009 |
|---|---|---|
| WO | WO 2006/109159 A2 | 10/2006 |
| WO | WO 2008/129014 A2 | 10/2008 |

OTHER PUBLICATIONS

European Search Report issued in European Patent Application No. 10015533.2 dated Mar. 11, 2011.
M. Hayes, "SID Conflict Resolution Plan," IFAST Secretariat, Aug. 26, 2003, pp. 1-3, XP002625253.
"Telephone numbers in Europe," Sep. 22, 2010 <http://en.wikipedia.org/wiki/Telephone_numbers_in_Europe>.
"List of country calling codes," Sep. 22, 2010 <http://en.wikipedia.org/wiki/List_of_country_calling_codes>.
"Telephone numbering plan" Sep. 22, 2010 <http://en.wikipedia.org/wiki/Telephone_numbering_plan>.
"List of international call prefixes," Sep. 22, 2010 <http://en.wikipedia.org/wiki/List_of_international_call_prefixes>.
Complete Application history of U.S. Appl. No. 12/889,093 filed Sep. 23, 2010 entitled Automating Emergency Calls Globally.

(Continued)

Primary Examiner — Pierre-Louis Desir (57) ABSTRACT

A mobile station automatically determines a country in which mobile station is or will operate from readily available information, without direct assistance from the local wireless communication network. A multimode mobile station, for example, capable of both 3GPP and CDMA operation, is programmed to detect both MCC type system identifiers (from 3GPP protocol) and SID type system identifiers (from CDMA protocol) and map both types of identifiers to country identifications. However, at some locations, the SID may not uniquely map to a country. In this later case, an exemplary mobile station may identify the country by determining a local time (LTM) offset and mapping a combination of the SID obtained at the current location and the LTM offset to an identification of the country. The mobile station may use the country determination to help select a preferred network or to enable a location based device feature.

22 Claims, 5 Drawing Sheets

OTHER PUBLICATIONS

Complete Application history of U.S. Appl. No. 12/889,076 filed Sep. 23, 2010 entitled Assisting A User To Store and Place A Call Back To Received International Number.

Complete Application history of U.S. Appl. No. 12/562,680 filed Sep. 18, 2009 entitled Enabling An Assisted Dialing On A Mobile Device.

* cited by examiner

FIG. 1

| Index | Band | Frequency | Access Technology (ACT) | Most Recently Acquired (MRA) |
|---|---|---|---|---|
| 1 | 850 | | GSM | Null |
| 2 | | | GSM | 2 |
| 3 | | | | |
| .. | | | | |
| .. | | | | |
| .. | 800 | | 1xRTT | 1 |
| .. | | | | |
| .. | | | | |

Table 1. Scanning Table (ST)

| MCC | Country |
|---|---|
| | |
| | |
| | |
| | |
| | |

Table 2 Country by MCC Table (CMT)

| SID Range | Conflict | LTM Offset (units of 30 mins) | Country |
|---|---|---|---|
| Xxxx - yyyy | True | | |
| www - uuuu | False | | |
| | | | |
| | | | |

Table 3 Country by SID Table (CST)

DETERMINING MOBILE STATION OPERATING COUNTRY TO ENABLE SYSTEM SELECTION OR OTHER LOCATION BASED DEVICE FEATURES WITHOUT NETWORK ASSISTANCE

TECHNICAL FIELD

The present subject matter relates to techniques and equipment to automatically determine a country in which a mobile station is or will operate from readily available information, without direct assistance from the local wireless communication network. The mobile station may use such a country determination as part of a method of selecting a preferred network through which it communicates or use the country identification to enable any of a variety of location based device features.

BACKGROUND

In recent years, use of mobile communications devices for voice telephone services, email or text messaging services and even multi-media services has become commonplace, among mobile professionals and throughout the more general consumer population. Mobile service provided through public cellular or PCS (personal communication service) type networks, particularly for voice telephone service, has become virtually ubiquitous across much of the world. Although networks in different countries often utilize different technologies, increasingly, mobile stations support roaming through many countries or even globally. To support such broad customer roaming, many mobile stations today are capable of using various networks and network technologies in many different countries. A variety of features of the mobile stations depend at least in part on knowledge by the mobile station and/or its user of the particular country in which the mobile station is currently operating.

For example, for a roaming subscriber, there is a financial benefit to the carrier selling service to the subscriber to implement procedures in the subscriber's mobile station to insure that the device selects the system in any area of operation that offers the best financial arrangement for services provided to the carrier's subscribers. A network operator in one country may have different financial roaming agreements with operators in other countries or even within the same country. These financial agreements generally may vary from country to country. As a result, for global roaming, knowledge of the country of operation can help the device to select the system offering the most favorable financial arrangement with the carrier.

By way of a more specific example, the carrier may operate its network over a wide geographic area, and the carrier will have roaming agreements with operators of other networks in many other areas where subscribers roam. In some countries, the carrier may operate a network and have a roaming agreement with another carrier for instances in which a mobile station can not obtain access to the carrier's own network. In such a case, it is preferable for the subscriber's mobile station to select the carrier's network first, select the network of the roaming partner second and select any other available network only in the event that the first two network choices are inaccessible. In other countries, the carrier may have agreements with two operators of local networks. However, in such a country, one roaming agreement offers better rates, therefore the network of the preferred roaming partner should be selected whenever possible.

Effective selection of networks of various operators under the various financial agreements are critical to the home network operator's profit margin, since when its customers roam, it wants to steer them to the roaming network that provides the best financial deal. When a user roams out of its home network operator's territory, either in country or out of country, its home network operator would naturally want the device to select the roaming network with which the home operator has the best financial deal. To achieve this, the home network operator's preference for which networks its customers use will vary from country to country.

The most efficient way in which the steering/selection to appropriate networks can be done automatically, is enabled if the device can determine the country in which it is operating, determine which networks are available in that area, look up one or more networks in a preference list of networks and then select the appropriate network that is available. It should be noted that the first step in such a preferential selection process involves a determination of the country of operation.

The need for the mobile station to determine the country in which the device is operating, however, is not limited only to automatic system selection by the device. An accurate country determination may also be helpful in different types of location based services. One example of a location based service or application relates to assisted dialing for international roaming. When a user travels from one country to another, the user needs to change (add or modify) the dial strings that are pre-fixed to the telephone number residing in a mobile station to match dialing protocol requirements for the country of current operations. For example, the International Direct Dial (IDD) prefix is 011 in the U.S.A., but the IDD is 00 in Venezuela. A U.S. number can be dialed from within the U.S. over a CDMA network without the IDD prefix. However, a U.S. number when dialed from Venezuela over a CDMA network would need to have the correct IDD prefix pre-pended to the telephone number when originating the call. To dial an international number from the USA, the user dials the 011 prefix followed by the international number. To make the same call from Venezuela, the user must dial the 00 prefix followed by the international number. This is not a problem when using the GSM/UMTS network since a "+" prefixed to the telephone number will result in the proper international call origination. Unfortunately, this is not the case for CDMA networks, as shown by the examples regarding the US and Venezuela. One solution would be to change how CDMA networks behave. This is usually problematic because network changes require more effort. An alternative might be to have the device implement an automatic program to determine the country from which the call is being originated and then pre-pend the appropriate IDD prefix to the dialed telephone number. However, again, this requires the device to determine the country of operation.

The need for the device to determine the country in which the device is operating is further exemplified in the following. Determination of country of operation might be used for web based applications running on the mobile station. As a specific example, suppose a user wanted to do a mobile station based web search of airports so that he could plan his outgoing trip or local trip. If the device automatically knew the country location, then the search could be localized. An alternative would be for the application to ask the user to manually input the country information, which may be undesirable from the user viewpoint. Another alternative would be to change the network behavior so that this information is transmitted. In addition, in this case a network assisted solution requires device changes so that the device can properly read the information being sent by the network.

As outlined above, there are a variety of scenarios in which it is desirable to have the device know or determine the country in which it is currently operating, even as the user roams from country to country. User input of the information adds a user step that may not be convenient for the customer. Changes to network operations can be difficult to implement, particularly on a large scale. For example, it can be expensive and a difficult diplomatic issue to have carriers in various countries operating different iterations of various network technologies to all take steps to insure that their networks transmit a country identification in a standardized way. It may take considerable time for the appropriate standards bodies to agree and more time for the carriers to deploy upgraded equipment. Device changes so that the device can properly read the information being sent by the network, in accord with new international standards, also takes time and money to deploy widely to customers of many different service providers and may require customers to obtain updated mobile stations.

Hence a need exists for a technique to allow a mobile station to determine, detect, or identify the country in which it is currently operating from readily available information, without direct assistance from the local wireless communication network, for example, without requiring a new network broadcast of a country identification. It may also be desirable if the country determination solution did not require the device to support any particular wireless wide area network technology.

SUMMARY

The teachings herein address the above discussed need by providing techniques for effective automatic determination of the country in which a mobile intends to operate.

For example, the description below discloses a method of automatic country dependent operation of a mobile station capable of wireless communications in accordance with protocols of at least two different standards. In each of various locations, as a user of the mobile station roams, the mobile station scans one or more frequencies on which the mobile station expects to find signals of a mobile communication network with which the mobile station may be able to communicate. From each scanning, the mobile station acquires a signal of a respective mobile communication network in an area where the mobile station is operating or intends to operate. Then, from each acquired network signal, at least one system identifier of the respective mobile communication network is obtained. At a first location, where the obtained system identifier comprises a mobile country code (MCC) in accord with a first protocol, the mobile station uses a first list or table stored in memory to map the MCC to an identification of a country. However, at a second location, where the obtained system identifier comprises a system identifier (SID) in accord with a different protocol, the mobile station uses a second list or table stored in memory to map the SID to an identification of a country. The mobile station also automatically adapts at least one of its operations, responsive to the country identifications.

When the mobile station is first Out-of-Box, the scanning of frequencies is based on a preference list order. When the country determinations occur at other times, typically when the mobile station has been powered back up or has lost wireless system connectivity, the scanning is based on a most recently acquired list. However, when the scanning based on the most recently acquired list fails to acquire a signal, further scanning may be based on the preference list order.

The methodology may also involve a detection of the technology of the respective mobile communication network from the acquired network signal during each scanning. In such a case, the list or table used in the mapping step corresponds to the detected technology of the respective mobile communication network. For example, the mobile station may be capable of operating on and therefore distinguishing between Third Generation Partnership Project (3GPP) and Third Generation Partnership Project 2/Code Division Multiple Access (3GPP2/CDMA) network technologies. For a 3GPP network technology, the first list or table contains mappings of MCCs to countries. For a CDMA network technology, the second list or table contains mappings of SIDs to countries.

The detailed description also encompasses a technique for automatic country dependent operation of a mobile station capable of wireless communications in accordance with protocols of at least two different standards, for example, and takes into account that some identifiers may map directly to a country but others may not. In each of various locations, as a user of the mobile station roams, the mobile station scans one or more frequencies on which the mobile station expects to find signals of a mobile communication network with which the mobile station may be able to communicate. From each scanning, the mobile station acquires a signal of a respective mobile communication network in the area; and from each acquired network signal, the mobile obtains at least one system identifier of the respective mobile communication network. In a country where the obtained system identifier uniquely corresponds to the country, the mobile station can identify that country from a direct mapping of the system identifier to the country identification. However, for another country where the obtained system identifier does not uniquely correspond to the second country, identifying the second country involves determining a local time (LTM) offset at a current location of the mobile station and mapping a combination of the system identifier obtained at the current location and the LTM offset to an identification of the second country. The mobile station also automatically adapts at least one of its operations, responsive to the country identifications.

The country identification techniques outlined above may be implemented as various combinations of method technologies, mobile station hardware and associated software (program instructions and mapping lists or tables). The software may be downloaded from system hardware connected to communicate with the mobile station directly or via the network(s). System hardware may comprise special purpose hardware or one or more general purpose devices programmed to implement the software download functions. A software product includes at least one machine-readable medium and information carried by the medium. The information carried by the medium may be executable program code and data for the various lists or tables, which enable a programmable mobile station device to implement the country identification-related functions like those discussed in more detail below.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various mobile station techniques disclosed herein relate to automatic determination of the country in which a mobile station is or will operate from readily available information, without direct assistance from the local wireless communication network. The mobile station may use such a country determination as part of a method of selecting a preferred network through which it communicates or use the country identification to enable any of a variety of location based device features.

By way of example, the mobile station will scan one or more frequencies on which the mobile station expects to find signals of a mobile communication network with which the mobile station may be able to communicate. From the scanning, the mobile station acquires a signal of a mobile communication network in an area where the mobile station is located. From the acquired network signal, the mobile station obtains at least one system identifier of the mobile communication network. The system identifier, however, may not by itself be unique with respect to the country in which the mobile station is located. An MCC corresponds to and thus identifies one country, even if systems in one country may have different MCCs, because any one MCC is not used in more than one country. However, this is not always true for SIDs, which some carriers may use in more than one country. During each country identification operation, the mobile station uses a list or table stored in memory of the mobile station to map the system identifier to an identification of the country in which the mobile station is operating. Where the SID is used and the SID is not unique, the mobile station determines a local time (LTM) offset and uses a combination of SID and LTM to map to an identification of the country in which the mobile station is operating.

Figure 1:
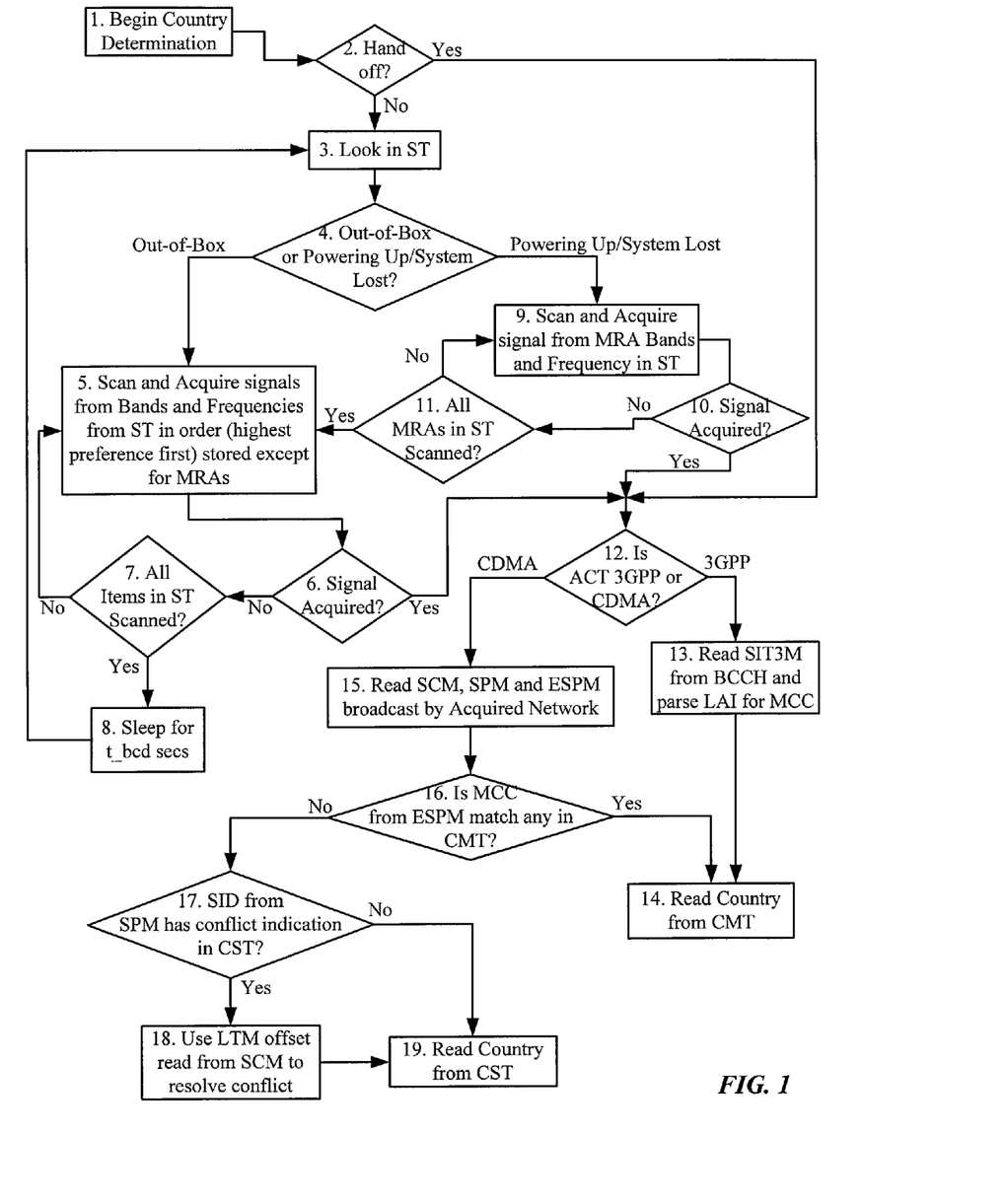
FIG. 1 illustrates an example of the processing that may be implemented in a mobile station or device, to determine the country in which the mobile station is currently operating or intends to operate.
Figure 2:
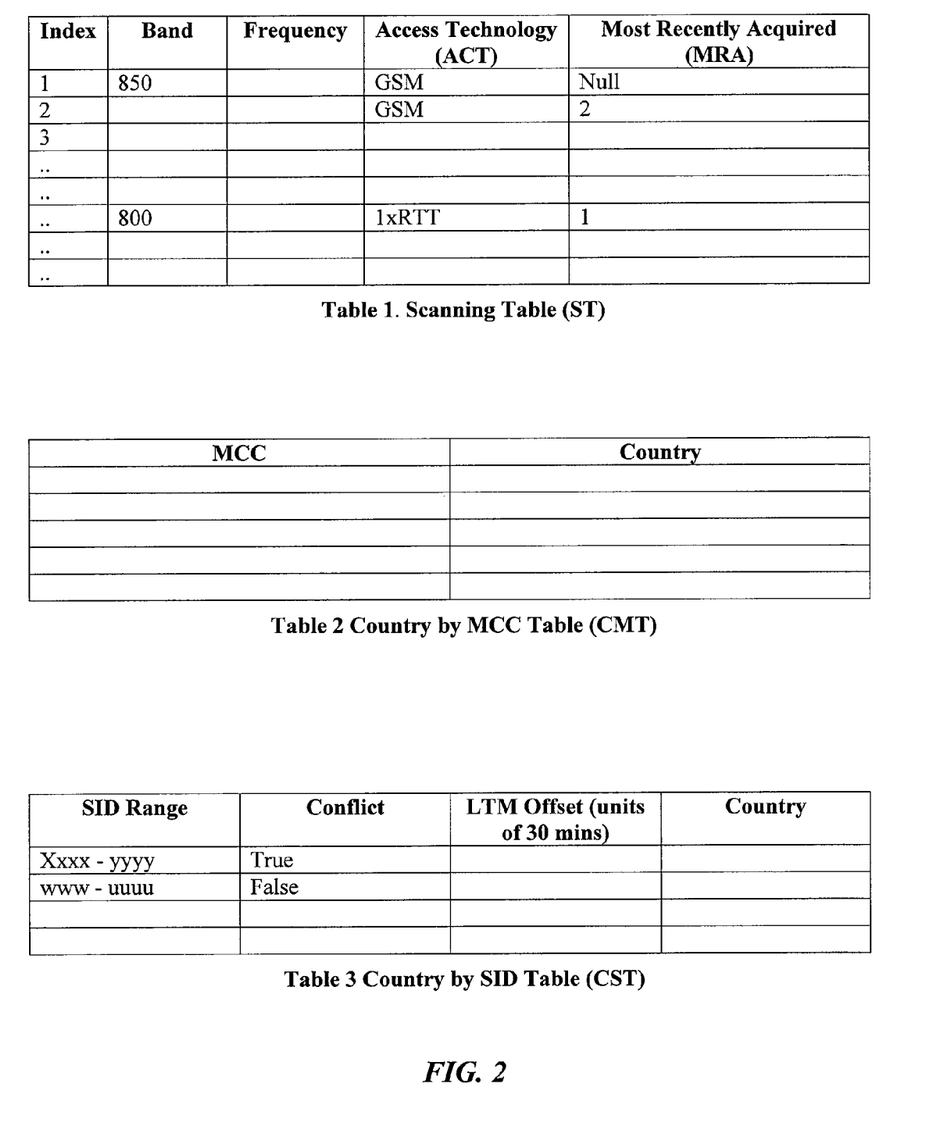
FIG. 2 shows the structure of three exemplary tables as might be used in country determination technique.

Reference now is made in detail to the examples illustrated in the accompanying drawings and discussed below. FIG. 1 is a flow chart that illustrates a specific example of the technique for automatically identifying country of operation from readily available over the air broadcast identifiers and stored information. The algorithm or process flow of FIG. 1, by which a mobile station determines the country in which the device currently operates or will operate, uses a number of tables stored in memory in the mobile station. Before describing the processing flow in detail, we will discuss examples of the relevant tables. FIG. 2 depicts the structure or format as might be used to implement three tables in our exemplary country determination technique (process of FIG. 1). For convenience, the tables are shown in FIG. 2 without being fully populated with the relevant data, although the data is described in some detail below.

In our example, the first table, Table 1 is referred to as the Scanning Table (ST). A Scanning Table (ST) such shown as table 1 is a list of all Bands, Frequencies and Access Technologies (ACT) that the device is capable of using. The order of the items in the "Band" and "ACT" columns should be such that highest preference (the first item on the list) should be given to the ACT and the Band that is likely to be the most widespread around the globe. The next highest preference should be for the next most widespread ACT and Band, and so on. The Bands and ACTs listed should be consistent with the device capabilities, i.e., if for example GSM is not supported by the device then that ACT should not be listed in the ST. If multiple Bands and Frequencies are indicated as MRA then there will be indication as to the relative time when these were acquired, e.g., 1 for the most recent, 2 for the next most recent, 3 for the next to the next most recent and so on. If a device is being used for the very first time (Out-Of-Box case) all entries in the MRA column will be NULL. The number of non-NULL entries in the MRA column shall be at least equal to the number of ACTs supported by the device.

The next table of interest in the present discussion is a Country by MCC Table (CMT). This table is a list that maps MCCs to specific countries. An example of how a CMT might be structured is shown in Table 2 of FIG. 2.

The next table used in our example is a Country by SID Table (CST). This table is a list that maps System Identifiers or "SIDs" to specific countries along with information about SID conflicts and Local Time (LTM) offset. LTM offset is the Local Time Offset from UTC in units of 30 minutes. An example of how CMT is structured is given in Table 3 of FIG. 2.

The International Forum on ANSI-41 Standards Technology, IFAST is responsible for allocating SIDs for 1xRTT systems. As such, it maintains a list of SID allocations by country and carrier, for example on the ifast.org website.

Note that the CST also lists the SID conflicts, some of which can be resolved if one examines the pages corresponding to the links for "SID Allocation Table—Sorted by Country" and "Table of National SID Assignments". Some of the conflicts can be resolved by observing that one of the two carriers to which that same SID has been assigned is not (or is no longer) a CDMA carrier. This information is available from IFAST and such cases may be resolved in advance when populating Table 3 of FIG. 2.

In those cases where this method of SID conflict resolution cannot be applied, that the conflict may be resolved through determination of the LTM offset. In these cases, the conflict should be indicated in Table 3, identifications of both countries are entered and the appropriate LTM offset (offsets) also are recorded in Table 3.

The country determination algorithm example of FIG. 1 uses the above tables to scan frequencies in order to find available networks and to map system information (MCC or SID) to a specific country. In the example, the system identifier or SID is a standard type of identifier as used in 1xRTT, however, the SID could be a sub-net identifier for EvDO, an access point identifier for WiFi, or a sub-net identifier for WiMax, or the like. The algorithm is explained step by step in the following paragraphs and is shown in the flow chart in FIG. 1. 1XRTT and EVDO systems will be referred to as CDMA. LTE and legacy 3GPP systems will be grouped together and will be referred to as 3GPP systems.

Referring now to FIG. 1, the flow chart illustrates an example of the process by which a mobile station might use the tables discussed above and available broadcast information already provided by wireless networks over the air, to determine the country in which the mobile station is currently located (where it is operating or will operate). An exemplary network in which the mobile station may operate and search is described later, with regard to FIG. 3. The device referred to in the outline is typically a mobile station, an example of which will be described in more detail later with regard to FIG. 4.

In the process flow of FIG. 1, at Step 1, the mobile station shall begin the Country Determination process. In Step 2, a determination is made as to whether or not the device has performed a hand off between cells/sectors. If the device has performed a hand off between cells/sectors the device processing shall go to Step 12, otherwise the device processing branches go to Step 3. In Step 3, the mobile station looks in the Scanning Table (ST) for bands/frequencies to scan.

In Step 4, processing branches based on whether this is the very first time that the particular device is being used (Out-of-Box). If this is not a just Out-of-Box use, then the mobile station apparently is searching for a network at a later power-up (powering back up after a shut down) or after a it has lost the wireless link with the system. In the example, if the mobile station is powered up for the very first time (Out-of-Box), the mobile station processing for determining the country of operation will branch to Step 5. Otherwise the device processing branches to Step 9.

Consider first the Out-of-Box situation. In that case, the processing from Step 4 goes to Step 5, where the mobile station scans and acquires signals from bands and frequencies in the order listed in the Scanning Table (ST), that is to say based on a basic preference list order specified by the customer's service provider or carrier. The mobile station will not scan frequencies included in the More Recently Acquired (MRA) list in ST. It should be noted that for mobile stations powered up for the very first time (Out-of-Box) the MRA list will be empty.

Step 6 involves a determination of whether or not a signal of a network has been acquired by the mobile station. At this step, if a signal is acquired, then processing by the mobile station branches to Step 12, otherwise the device processing branches to Step 7. Assume now that the mobile station has not acquired a network signal (NO branch from Step 6 to Step 12). In Step 7, if all the bands and frequencies in ST have been scanned, then the mobile station processing goes to Step 8, in which the device shall sleep for t_bcd secs and then go back to Step 3 to start the process of country determination again. The value t_bcd is a timer that is defined by the device/radio modem chipset manufacturer in discussions with the home network operator. However, at Step 7, if the device has not yet scanned all the bands and frequencies in the ST, then the device processing branches back from Step 7 to Step 5 to scan the next band/frequency in the ST to see if a signal can be acquired from an available network. In this way, the scan at Step 5 and determinations at Step 6 and 7 will continue in a loop until the signal for a network indicated by an entry in the ST is acquired (branch from Step 6 to Step 12) or all entries are exhausted (branch Step 7 to Step 8 for sleep and return later to restart the process at Step 3).

Recall that Step 4 involved a determination of whether or not this was the first country determination when the mobile station was first turned-on Out-of-Box. If not, then the country determination would be part of an operation after powering back up the mobile station or following a loss of system connectivity, therefore processing branches from Step 4 to Step 9. At processing Step 9, the mobile station scans and acquires signals from the MRA bands and frequencies in table ST. The band/frequencies shall be scanned according to the indication given in the MRA list as to the relative time when these systems were most recently acquired. The most recent entry shall be scanned first and the least recent entry shall be scanned last.

Based on the scanning at Step 9, the mobile station determines in Step 10 whether or not a signal of a network has been acquired by the mobile station. At this step, if a signal is acquired, then processing by the mobile station branches to Step 12, otherwise the device processing branches to Step 11. Assume now that the mobile station has not acquired a network signal (NO branch from Step 10 to Step 12.) In Step 11, if all the MRA entries in ST have been scanned the mobile station processing will go to Step 5 to scan the remaining entries in ST table as outlined earlier, otherwise the device processing will go back to Step 9 to scan the next MRA entry in ST. In this way, the scan at Step 9 and determinations at Step 10 and 11 will continue in a loop until the signal for a network indicated by an MRA entry in the ST is acquired (branch from Step 10 to Step 12) or all MRA entries are exhausted (branch Step 11 to Step 5 for searching other bands/frequencies in ST). Processing at Steps 5 to 7 may proceed as discussed with regard to the Out-of-Box scenario discussed above.

Assume now that the mobile station processing for country determination has reached Step 12, via one of the several branches (from Step 2, 6 or 10) discussed above. All of the paths through the process to Step 12 involve a successful signal acquisition, either via a handoff (Step 2) or via scanning (Steps 5, 6 or Steps 9, 10). Step 12 involves a determination of whether or not the acquired signal is that of a network using CDMA wireless network access technology. If the acquired signal's access technology is CDMA, then the mobile station processing will branch at Step 12 to Step 15; whereas if the acquired signal's access technology is a 3GPP technology then the mobile station processing will branch at Step 12 to Step 13.

For discussion purposes, we first will consider the 3GPP technology scenario (3GPP branch from Step 12 to Step 13). In Step 13, the mobile station reads messages broadcast over-the-air by the 3GPP network, including System Information Type 3 messages (SIT3M) broadcast on the broadcast control channel (BCCH) of the 3GPP type network. The mobile station parses the MCC part of the Location Area Identifier or "LAI" (see 3GPP TS 25.331 for specification of the System Information Type 3 messages). Then, at Step 14, the mobile station uses the MCC found in Step 13 to look-up the country of operation in the Country by MCC Table (CMT).

For discussion purposes, we will consider next the scenario in which the technology for the acquired network signal is a CDMA technology (CDMA branch from Step 12 to Step 15). In Step 15, the mobile station reads messages broadcast by 1xRTT network or the like, such as the (SPM) System Parameters Message (for SID/NID), the (ESPM) Extended System Parameters Message (for MCC) and the (SCM) Sync Channel Message for the LTM offset (Local Time Offset from Coordinated Universal Time or "UTC" in units of 30 minutes). Attention may be directed to 3GPP2 C.S0005 Upper Layer (Layer3) Signaling Standard for CDMA 2000 Spread Spectrum Systems.

Next, at Step 16, the mobile station determines whether or not any MCC obtained from the ESPM type message matches an entry in the CMT table. If there is a match of an acquired MCC with a CMT table entry, the mobile station processing branches at Step 16 to Step 14, to determine the country based on the MCC obtained in Step 15.

However, at Step 16, if there is no match of an MCC found in Step 15 with an entry in the CMT table, then the mobile station processing goes to Step 17. At this point, the mobile station determines if there is a conflict related to the acquired SID. A conflict indicates that the SID is not sufficiently unique to map directly to a country identification, e.g. because the SID is used in more than one country. At Step 17, if the SID found in Step 15 has a conflict indication in the Country by SID Table (CST), then the mobile station processing will go to Step 18 in which the mobile station device uses the acquired LTM offset to resolve the SID conflict in CST. After Step 18 the mobile station processing goes to Step 19. Alternatively, at Step 17 if the SID found in Step 15 has no conflict indication in the Country by SID Table (CST), then the mobile station processing will skip Step 18 and go directly to Step 19. In either case, at Step 19, the mobile station utilizes the SID (un-conflicted or after conflict resolution) to read the identification of the country of operation for the mobile station from the CST.

Although not shown as a step in the flow chart, a number of other processes are implemented in the mobile station, which utilize the country determinations that result from the process from of FIG. 1 at different times/locations. As the user roams with the mobile station, the mobile station automatically adapts at least one operation of the mobile station based on these country identifications. For example, the mobile station may use the country determination to help select a preferred network or system in each visited country, or the mobile station may use a country determination to enable a location based device feature.

To appreciate the application of the above-discussed processing, it may be helpful to consider the context of an exemplary system of networks as well as the hardware and software of an exemplary mobile station device, as may be involved in implementing the selection technique. The mobile station will be discussed later with regard to FIG. 4.

Figure 3:
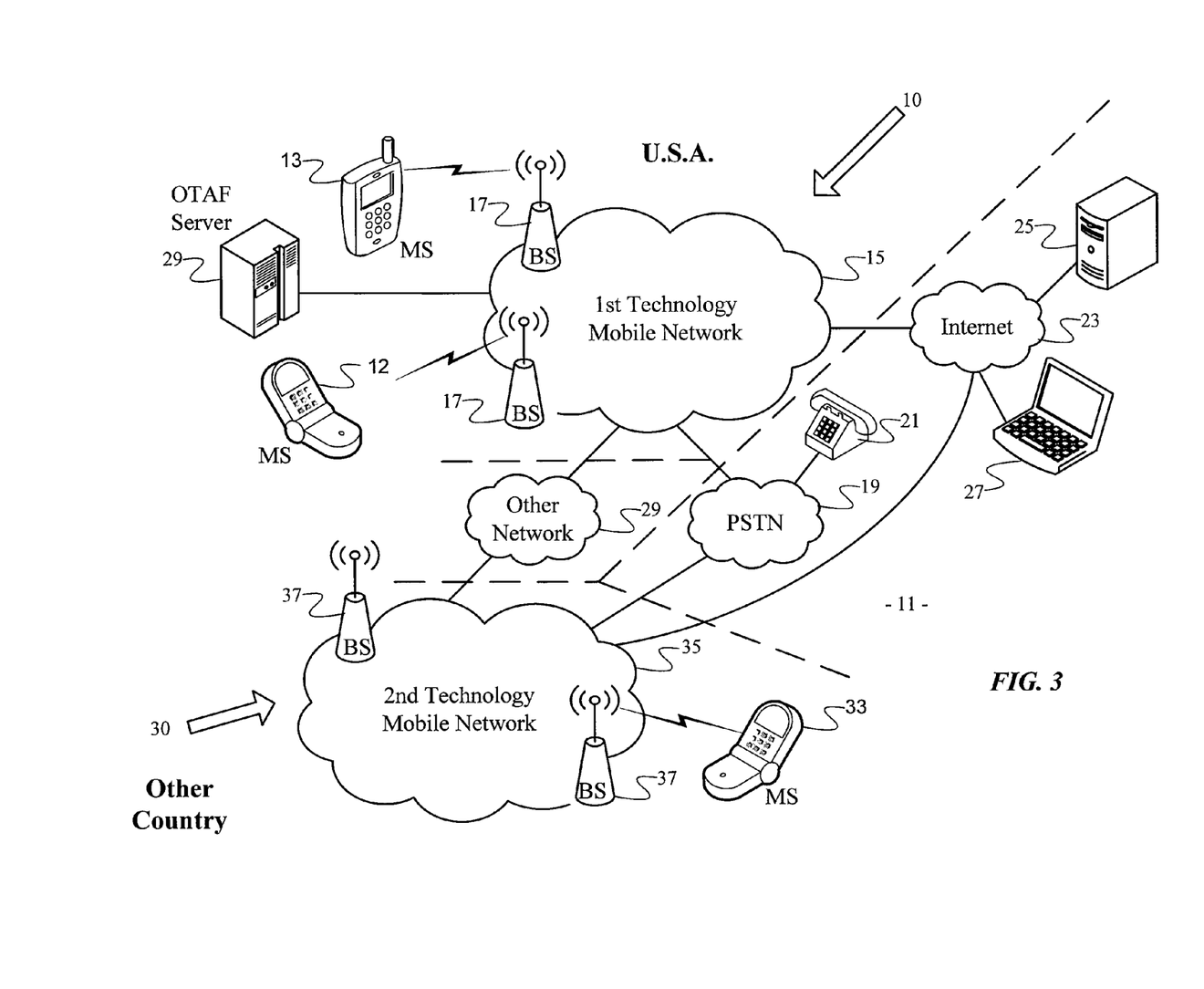
FIG. 3 is a high level functional block diagram, useful in explaining mobile stations, network elements and other components that may be involved in roaming mobile station communications that may take advantage of the country determination technique.

FIG. 3 is a functional block diagram of an exemplary system of wireless networks for providing mobile voice telephone services and various data services. For discussion purposes, the diagram shows two wireless networks 10 and 30 operated in accord with different technology standards, wherein the first network 10 is located in the U.S.A. and the other network 30 is operated in another country. The networks 10 and 30 often (but not always) may be operated by different providers, carriers or operators. The communication networks 10 and 30 implementing the illustrated system provide mobile voice telephone communications as well as other services such as text messaging and various multimedia packet data services, for numerous mobile stations.

For purposes of later discussion three mobile stations 12, 13 and 33 appear in the drawing. The elements indicated by the reference numerals 10 and 30 generally are elements of the respective operator's network, although the mobile stations 12, 13 and 33 typically are sold to the carrier's customers. Today, mobile stations typically take the form of portable handsets, smart-phones or personal digital assistants and data cards for computers, although they may also be implemented in other form factors. Each mobile communication network 10 or 30 provides communications between mobile stations 12, 13 and 33 as well as communications for the mobile stations with other networks and stations shown generally at 11 outside the mobile communication networks. An inter-carrier or other intermediate network 29 may provide communication connectivity between the mobile communication networks 10 and 30.

Each network 10 and 30 allows users of the mobile stations operating through the respective network to initiate and receive telephone calls to each other as well as through the public switched telephone network (PSTN) 19 and telephone stations 21 connected thereto. One or both of the networks typically offers a variety of text and other data services, including services via the Internet 23, such as downloads, web browsing, e-mail, etc. via servers shown generally as 25 as well as message communications with terminal devices represented generally by the personal computer 27.

The networks 10 and 30 are generally similar, except in our example, they offer respective services in different countries using via two different wireless communication technologies (and associated different protocols). For purposes of an example for discussion here, we will assume that the network 10 is a CDMA (IS-95, 1XRTT and EVDO) technology network conforming to one of the CDMA standardized protocols, whereas the network 30 is a 3GPP (LTE/GSM/UMTS) technology network conforming to one of the 3GPP standardized protocols.

The mobile communication network 10 typically is implemented by a number of interconnected networks in the particular country, e.g., in the U.S.A in our example. Hence, the overall network 10 may include a number of radio access networks (RANs) in different parts of the country, as well as regional ground networks interconnecting a number of RANs and a wide area network (WAN) interconnecting the regional ground networks to core network elements. A regional portion of the network 10, such as that serving mobile station 13 will typically include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 typically comprises a base transceiver system (BTS) which communicates via an antennae system at the site of base station and over the airlink with one or more of the mobile stations 13, when the mobile stations are within range. The BTS is the part of the radio network that sends and receives RF signals to/from the mobile stations that the base station currently serves. Hence, in our example, the BTS would utilize CDMA (IS-95, 1XRTT and EVDO) type transceiver equipment and implement communications in accord with the protocols of the applicable CDMA protocol standard, for signaling, registration, voice communication, data communication, etc. For example, each base station 17 will broadcast certain standardized information to allow a mobile station 12 or 13 in the region to search for, find and lock-onto the base station 17 and acquire information needed to register and initiate communications via the network 10, all in accord with the standard CDMA protocols. Of note, the standardized broadcast information includes system identifiers or SIDs assigned to various system portions of the network 10. For example, the System Parameters Message (SPM) carries SID/NID information; and if provided, the Extended System Parameters Message (ESPM) carries the MCC. The Sync Channel Message (SCM) carries the offset Local Time Offset (LTM) from Coordinated Universal Time or (UTC).

The radio access networks also include a traffic network represented generally by the cloud at 15, which carries the user communications for the mobile stations 12, 13 between the base stations 17 and other elements with or through which the mobile stations communicate. Individual elements such as switches and/or routers forming the traffic network 15 are omitted here for simplicity. Although not separately shown, the network 15 will include or connect with a number of service control elements, for authenticating mobile stations to use the network 10, for authenticating mobile station users and/or for authorizing users or devices to access various services and service features offered by the particular network 10, and for usage accounting and billing functions.

The traffic network portion 15 of the mobile communication network 10 connects to a public switched telephone network 19. This allows the network 10 to provide voice grade call connections between mobile stations and regular telephones connected to the PSTN 19. The drawing shows one such telephone at 21. The traffic network portion 15 of the mobile communication network 10 also connects to a public packet switched data communication network, such as the network commonly referred to as the "Internet" shown at 23. Packet switched communications via the traffic network 15 and the Internet 23 may support a variety of user services through the network 10, such as mobile station communications of text and multimedia messages, e-mail, web surfing or browsing, programming and media downloading, etc. For example, the mobile stations may be able to receive messages from and send messages to user terminal devices, such as personal computers, either directly (peer-to-peer) or via various servers 25. The drawing shows one user terminal device as a personal computer (PC) at 27, by way of example.

The carrier or service provider that operates the network 10 will also operate a number of systems that provide ancillary functions in support of the communications services provided through the network 10, and those elements communicate with other nodes/elements of the network 10 via one or more private IP type packet data networks or Intranets (not separately shown). Such systems maintain various records used for authentication and authorization functions and provisioning necessary information into the mobile stations to enable they operation via the network 10. Of note for purposes of the present discussion of the enhanced network or system selection function, one or more such systems provide the capability to download at least the lists and/or updates thereof into the mobile stations of the network operator, in this example, via the networks. These systems may also support downloading of the executable programming for the country determination process of FIG. 1 via the networks, to initially install such programming in the mobile stations or to fix or update the programming in the mobile stations over time. An example of such a system that may facilitate programming and/or list downloading via the networks is the Over-The-Air service activation/provisioning Function (OTAF) 28. In the example, the OTAF 28 may be a server connected to the traffic network 15, to enable the server to communicate with the mobile stations of the network operator's customers.

As noted earlier, many mobile wireless communications networks have been deployed and are available today. For purposes of discussion the example of FIG. 3 shows a second mobile network 30 that is deployed in another country. Like the U.S.A., the other country may have more than one such network which have the same or overlapping territories of operation. A network in the other country could be operated by the same carrier that operates the network 10 in the U.S.A. In our example, however, the network 30 is operated by a different carrier or service provider than the operator of network 10. In some areas, the second network 30 could utilize the same wireless technology as the network 10, but in our example, the network 30 utilizes a different wireless network technology. The network 10 is a CDMA technology network operating in accord with an applicable CDMA protocol, and in the example, the network 30 in the other country is a 3GPP (LTE/GSM/UMTS) technology network.

Like the network 10, the physical elements of the radio access network (RAN) 30 include a number of base stations (BSs) 37, each of which includes a base transceiver system (BTS) and associated antenna system. In our example, each BTS of a base station 37 would utilize 3GPP (LTE/GSM/UMTS) type transceiver equipment and implement communications in accord with the protocols of the applicable 3GPP standard, for signaling, registration, voice communication, data communication, etc. For example, each base station 37 will broadcast certain standardized information to allow a mobile station 12 or 33 in the region to search for, find and lock-onto the base station 37 and acquire information needed to register and initiate communications via the network 30, all in accord with the standard 3GPP protocols. Of note, in accord with such protocols, the System Information Type 3 messages (SIT3M) that each base station 37 broadcasts on the broadcast control channel (BCCH) of the 3GPP type network includes a Location Area Identifier or (LAI), which contains the MCC.

The radio access network portions of network 30 also include a traffic network represented generally by the cloud at 35, which carries the user communications for the mobile stations 12, 33 between the base stations 37 and other elements with or through which the mobile stations communicate. Individual elements such as switches and/or routers forming the traffic network 35 are omitted here for simplicity. Although not separately shown, the network 35 will include or connect with a number of service control elements, for authenticating mobile stations to use the network 30, for authenticating mobile station users and/or for authorizing users or devices to access various services and service features offered by the particular network 30.

Similar to network 10, the traffic network portion 35 of the mobile communication network 30 connects to a public switched telephone network 19, to offer voice grade telephone call connections between mobile stations and regular telephones 21 connected to the PSTN 19. The traffic network portion 35 of the mobile communication network 30 also connects to a public packet switched data communication network, such as the network commonly referred to as the "Internet" shown at 23, for various mobile station communications with servers 25 and/or user terminal devices 27. Although omitted for simplicity, the network 30 may also include various systems that provide ancillary functions in support of the communications services provided through the network 30, such as a system similar to the OTAF 29 for providing data and/or programming downloads to the mobile stations of the network operator's customers.

As discussed earlier, the country determination technique of FIG. 1 configures a mobile station to determine country of operation at various times and locations as the user roams. The country determination, for example, may be used as part of the mobile station's system selection procedure, so as to take advantage of the most favorable roaming agreements between network operators, when selecting networks or systems as the customer roams with the mobile station. In the networks of FIG. 3 as an example, the algorithm enables a mobile station such as 12 to effectively identify the country of operation. Associated programming then may enable the mobile station to select between the CDMA (IS-95, 1XRTT and EVDO) network 10 when in one country (from among any number of one or more networks in that country) and to select the 3GPP (LTE/GSM/UMTS) technologies of network 30 when in another country (from among any number of one or more networks in that other country). The mobile station country determination may impact operation of other device features such as assisted dialing in various different counties.

As shown by the discussion above, the country determination procedure and features that use it, such as system selection and/or assisted dialing, are implemented in each of the appropriately configured mobile stations 12, 13 and 33. Typically, the programming is installed in memory in the mobile stations, for example, by downloading through the network and over the air from an OTAF server 29 or the like. The tables (FIG. 2) may be initially installed in memory and updated from time to time in a similar fashion. Those skilled in the art should be quite familiar with the structure, programming and operation of a variety of different mobile stations that might utilize the country determination procedure discussed herein. However, for general completeness and to perhaps help some readers to appreciate an actual implementation of the country determination procedure, it may be helpful to briefly consider a high level example of a particular mobile station device.

Figure 4:
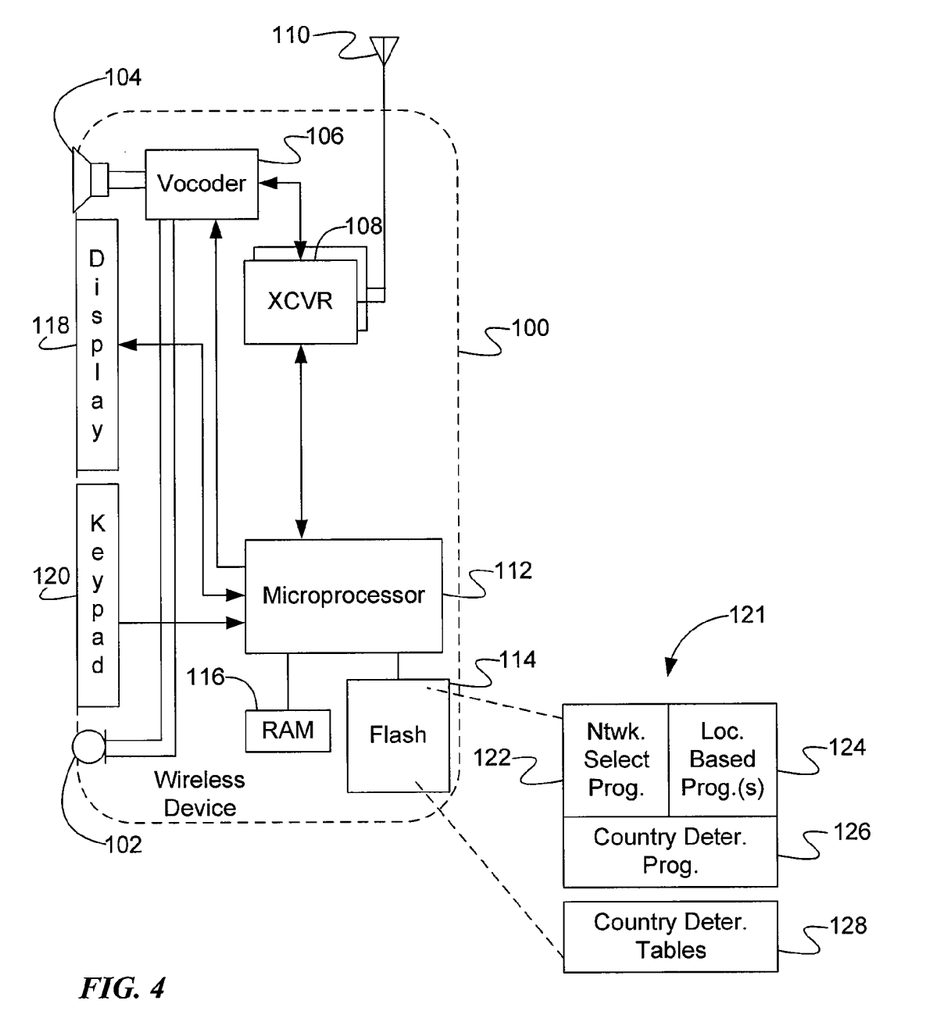
FIG. 4 is a high level functional block diagram of a handset type example of a mobile station or device, which may be configured to perform the country determination in accord with the procedure of FIG. 1.

FIG. 4 provides a block diagram illustration of an exemplary wireless device 100, which may be the wireless device 12, 13 or 33 of a customer of any of the network operators. Although the wireless device 100 may be a smart-phone or may be incorporated into another device, such as a portable personal computer, personal digital assistant (PDA) or the like, for discussion purposes, the illustration shows the wireless device 100 in the form of a handset. The handset embodiment of the wireless device 100 functions as a normal digital wireless telephone station. For that function, the station 100 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 100 also includes at least one digital transceiver (XCVR) 108. The handset 100 is a multimode device capable of operations on various technology type networks, such as the networks 10 and 30. For example, the handset 100 may be a dual mode device capable of utilizing either or both of CDMA (IS-95, 1XRTT and EVDO) technologies and 3GPP (LTE/GSM/UMTS) technologies. For that purpose, the transceiver (XCVR) 108 could be a multimode transceiver, or the handset 100 may include two or more transceivers each of which supports a subset of the various technologies or modes. The concepts discussed here encompass embodiments of the station 100 utilizing any digital transceivers that conform to current or future developed digital wireless communication standards.

The transceiver 108 provides two-way wireless communication of information, such as vocoded speech samples and/or digital message information, in a selected one of the technology modes. The transceiver 108 also sends and receives a variety of signaling messages in support of the various voice and data services provided via the station 100 and the communication network (described earlier with regard to FIG. 3). Each transceiver 108 connects through RF send and receive amplifiers (not separately shown) to an antenna 110. In the example, the transceiver 108 is configured for RF communication in accord with a digital wireless protocol, such as the current CDMA and 3GPP protocols. For the country determination procedure and related network selection and assisted dialing functions, network communications via the transceiver 108 and antenna 110 will include receiving CDMA and 3GGP broadcasts of system identification information as well as detection of the available network technology types, in any given service area. The network communications may also support downloading of programming and list data and/or updates thereof from a server such as the OTAF server 29.

The station 100 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during a system selection operation or during a selection software download operation. Various combinations of the keypad 120, display 118, microphone 102 and speaker 104 may be used as the physical input output elements of the GUI, for multimedia (e.g. audio and/or video) communications. Of course other user interface elements may be used, such as a stylus and touch sensitive display screen, as in a PDA or smart phone.

A microprocessor 112 serves as a programmable controller for the wireless device 100, in that it controls all operations of the wireless device 100 in accord with programming that it executes, for all normal operations, and for operations involved in selecting a preferred technology and selecting an available network of the appropriate technology type, for mobile communications. In the example, the wireless device 100 includes flash type program memory 114, for storage of various "software" or "firmware" program routines and mobile configuration settings, such as mobile directory number (MDN) and/or mobile identification number (MIN), etc. The wireless device 100 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming 121 stored in the flash type program memory 114, sometimes referred to as "firmware," is loaded into and executed by the microprocessor 112.

In the example, the executable programming 121 stored in the flash memory 114 includes a network selection program module 122. The executable programming 121 also includes programming 124 for one or more location based features of the mobile station 100, for example, to provide assisted dialing based on country of operation. The executable programming 121 also includes programming 126 implementing the country determination, in this case, in the manner taught by the flow chart of FIG. 1. The data stored in the flash memory 114 will include the various tables or lists 128 used to determine the country of operation, in this case, ST, CMT and CST tables structured as taught by FIG. 2.

Although not shown, 3GPP variants of the mobile stations often utilize a Subscriber Identity Module or "SIM" card (called UICC in the 3GPP standards documents—universal integrated circuit card), which provides secure storage for various data needed for operation of a mobile station, such as data identifying the mobile station to the network (e.g. MDN and/or MIN). However, the SIM card is a standardized removable module that can be moved from one mobile station device to another, to effectively move the mobile station identity from one device to another. As discussed above, the list data can be downloaded into flash memory or the like in the mobile station. In implementations using SIM cards, another approach would be to download at least the list data to SIM card storage.

As outlined above, the mobile station 100 of FIG. 4 is a dual mode device and is programmed to determine country of operation and use that determination at least as part of its system or network selection procedure. As noted, the mobile station country determination may impact operation of other device features such as assisted dialing. The mobile station 100 is a dual mode device in that it is capable of wireless communications in accordance with a CDMA protocol, for example via network 10 in the U.S.A., and is capable of wireless communications in accordance with a 3GPP protocol such as via the network 30 in the other country. The programming 126 and the tables (FIG. 2) 128 allow the mobile station 100 to determine a country in which the mobile station is operating or intends to operate.

For example, as the user of the mobile station roams, the network selection programming 122 or the location based programming 124 activates the country determination programming 126 to identify the country of operation. Under control of the programming 126, the microprocessor 112 causes the transceiver(s) 108 to initiate scanning. Hence, at different locations and/or times, the mobile station 100 scans one or more frequencies on which the mobile station expects to find signals of a mobile communication network with which the mobile station may be able to communicate, using the ST table. From the scanning, the mobile station 100 acquires a signal of a respective mobile communication network 10 or 30 in an area where the mobile station is operating or intends to operate, such as a SID and/or a MCC.

The programming 126 also causes the processor 114 of the mobile station to determine if each acquired network signal conforms to a CDMA protocol or a 3GPP protocol and to obtain a system identifier of the respective mobile communication network. If the acquired signal conforms to the 3GPP protocol, such as when received from 3GPP network 30 in the other country, then the program 126 enables the microprocessor 112 to map the system identifier (e.g. MCC) of the respective mobile communication network directly to an identification of the particular country using the CMT table.

When the acquired signal conforms to the CDMA protocol, from example when received from the CDMA network 10 in the U.S.A., the microprocessor 112 of the mobile station 100 also determines whether or not the CDMA type system identifier (SID) of the respective mobile communication network is unique. In a case in which an acquired signal conforms to the CDMA protocol and the SID is unique, the programming 126 enables the microprocessor 112 of the mobile station 100 to map the system identifier of the respective mobile communication network directly to an identification of a country, using the CST table. However, if the SID is not sufficiently unique, the programming 126 enables the microprocessor 112 to resolve the conflict based on a local time (LTM) offset at the current location of the mobile station and identify the country from the CST table. In this way, the programming 126 enables the microprocessor 112 to map a combination of the system identifier of the respective mobile communication network and the LTM offset to an identification of a country in which the mobile station is operating or intends to operate.

As shown by the above discussion, functions relating to the identification of a country for mobile station operations to may be implemented in the form of programming and associated list data for controlling operations of the mobile station device. An example of the device has been discussed above relative to FIG. 4. As mentioned earlier, the relevant software (programming and/or list data) may be downloaded and/or updated from a computer platform, for example, from an OTAF server or the like communicating with the mobile station via the network. Although special purpose devices may be used to support the download and update functions, such devices also may be implemented using one or more general purpose hardware platforms running appropriate programming. A host or other general purpose data processing device configured to perform as the OTAF might run "server" programming for the programming and list download functions, whereas the mobile station might run appropriate "client" programming for the complementary functions. Of course, the mobile station runs the programming to implement the country determination functions, as discussed above, as well as to implement system selection and other location related features of the device.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the various country determination and technology detection lists. The programming code 122-124 is executable by the microprocessor 112 of the mobile station, e.g. from storage in the flash memory 114. For downloading and installation, however, the software is stored within the general-purpose computer platform or the like serving as the OTAF system.

Figures 5, 6:
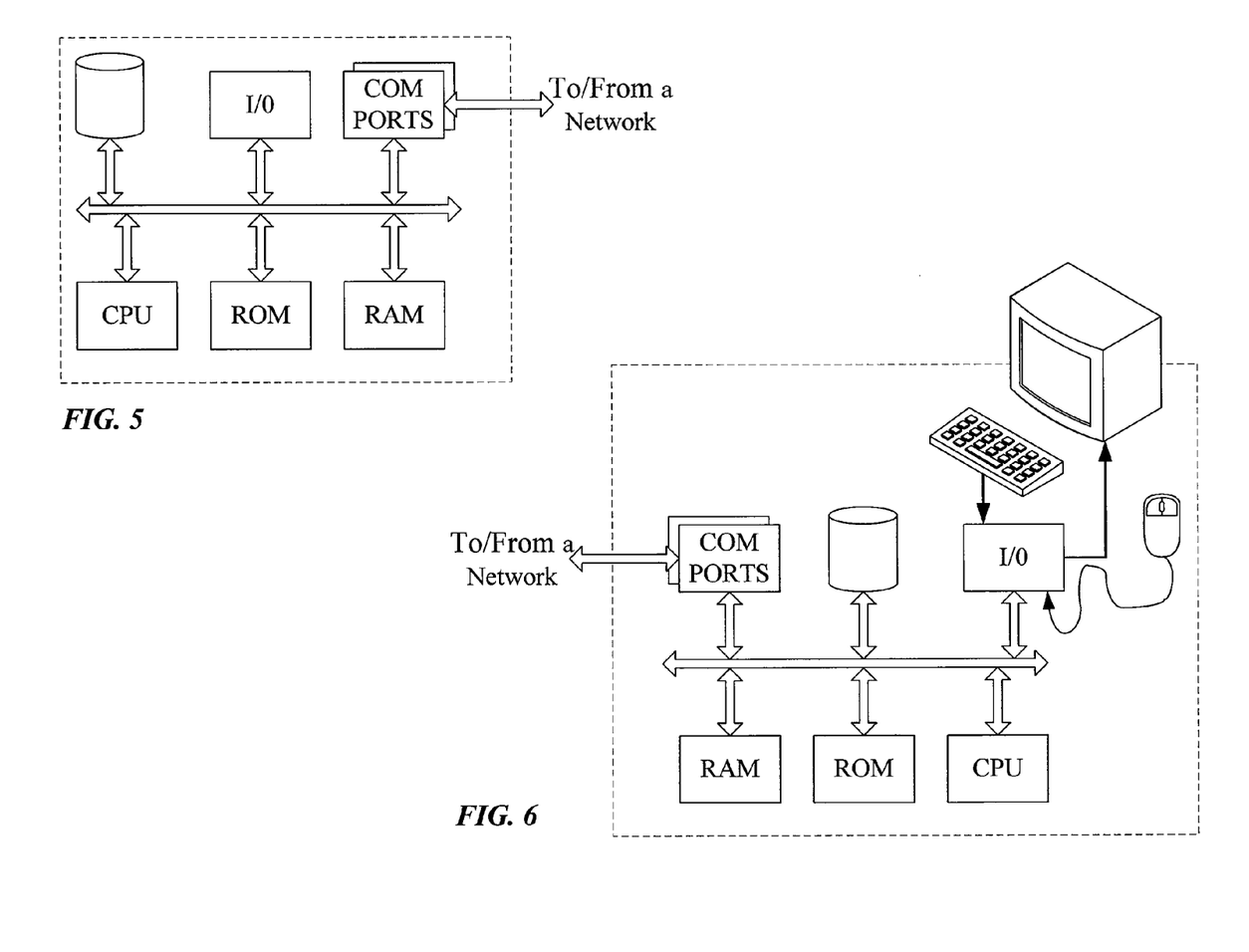
FIG. 5 is a simplified functional block diagram of a computer that may be configured as a host or server.
FIG. 6 is a simplified functional block diagram of a personal computer or other work station or terminal device.

FIGS. 6 and 7 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of network selection outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software programming from a computer or processor into the mobile station, for example, from the OTAF server or other computer of the network operator into the mobile station(s) of the operator's customer (s). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, optical or magnetic disks, such as any of the storage devices in any computer(s) or the like, such as may be used to implement the information flow control, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

1XRTT—One (1) times (x) Radio Transmission Technology
3GPP—Third (3rd) Generation Partnership Project
3GPP2—Third (3rd) Generation Partnership Project 2
ACT—Access Technology
AT—Acquisition Table
BCCH—Broadcast Control Channel
BS—Base Station
BTS—Base Transceiver System
CD—Compact Disk
CDMA—Code Division Multiple Access
CDR—Call Detail Record
CD-ROM—Compact Disk-Read Only Memory
CMT—Country by MCC Table
CPU—Central Processing Unit
CST—Country by SID Table
DVD—Digital Video Disk
DVD-ROM—Digital Video Disk-Read Only Memory
EEPROM—Electrically Erasable Programmable Read Only Memory
EPROM—Erasable Programmable Read Only Memory
ESPM—Extended System Parameters Message
EVDO—1x/Evolution—Data Only
GEO—GEOgraphic (area)
GSM—Global System for Mobile
ID—Identification
IFAST—International Forum on ANSI-41 Standards Technology
IP—Internet Protocol
IR—InfraRed
LAI—Location Area Identifier
LTE—Long Term Evolution
LTM—Local Time Offset with respect to UTC
MCC—Mobile Country Code
MDN—Mobile Director Number
MIN—Mobile Identification Number
MNC—Mobile Network Code
MRA—Most Recently Acquired
MRU—Most Recently Used list
MS—Mobile Station
MSC—Mobile Switching Center
MTSO—Mobile Telephone Switching Office
NID—Network Identifier
PDA—Personal Digital Assistant
OTAF—Over-The-Air service activation/provisioning Function
PCS—Personal Communication Service PRL—Preferred Roaming List
PROM—Programmable Read Only Memory
PSTN—Public Switched Telephone Network
RAM—Random Access Memory
RAN—Radio Access Network
RF—Radio Frequency
ROM—Read Only Memory
SCM—Sync Channel Message
SIM—Subscriber Identity Module
SIT3M—System Information Type 3 messages
SPM—System Parameters MessageSID—System Identifier
ST—Scanning Table
UICC—Universal Integrated Circuit Card
UMTS—Universal Mobile Telecommunications Systems
UTC—Coordinated Universal Time
WAN—Wide Area Network
XCVR—Transceiver

What is claimed is:

1. A method of automatic country dependent operation of a mobile station capable of wireless communications in accordance with protocols of at least two different standards, comprising steps of:
in each of a plurality of locations as a user of the mobile station roams, scanning one or more frequencies on which the mobile station expects to find signals of a mobile communication network with which the mobile station may be able to communicate;
from each scanning, acquiring a signal of a respective mobile communication network in an area where the mobile station is operating or intends to operate;
from each acquired network signal, obtaining at least one system identifier of the respective mobile communication network;
at a first location wherein the obtained at least one system identifier comprises a mobile country code (MCC) in accord with a first of the protocols, using a first list or table stored in memory of the mobile station, mapping the MCC to an identification of a country in which the mobile station is operating or intends to operate;
at a second location wherein the obtained at least one system identifier comprises a system identifier (SID) in accord with a second of the protocols, using a second list or table stored in memory of the mobile station, determining whether the SID maps to more than one identification of a country in the second list or table, and mapping a combination of the SID and a parameter of the acquired network signal to an identification of a country in which the mobile station is operating or intends to operate upon determining that the SID maps to more than one identification; and
automatically adapting at least one operation of the mobile station responsive to the country identifications.

2. The method of claim 1, wherein when the method of automatically determining the country occurs when the mobile station is first Out-of-Box, the scanning of one or more frequencies involves scanning of frequencies in one or more bands based on a preference list order.

3. The method of claim 1, wherein when the method of automatically determining the country occurs when the mobile station has been powered back up or has lost wireless system connectivity, the scanning of one or more frequencies involves scanning of frequencies in one or more bands based on a most recently acquired list.

4. The method of claim 3, wherein when scanning of frequencies in one or more bands based on the most recently acquired list fails to acquire a signal, the scanning step further involves scanning of one or more frequencies in one or more bands based on a preference list order.

5. The method of claim 1, further comprising a step of detecting a technology of the respective mobile communication network from the acquired network signal during each scanning.

6. The method of claim 5, wherein the list or table used in the mapping step corresponds to the detected technology of the respective mobile communication network.

7. The method of claim 6, wherein:
the step of detecting the technology of the respective mobile communication network is capable of distinguishing between Third Generation Partnership Project (3GPP) and Third Generation Partnership Project 2/Code Division Multiple Access (3GPP2/CDMA) network technologies,
for a 3GPP network technology, the first list or table contains mappings of MCCs to countries, and
for a CDMA network technology, the second list or table contains mappings of SIDs to countries.

8. The method of claim 1, wherein, for a country where the SID is not unique, the step of mapping the SID to country identification comprises:
determining a local time (LTM) offset with respect to Coordinated Universal Time (UTC) at the second location; and
mapping a combination of the SID and the LTM offset to the identification of the country in which the mobile station is operating or intends to operate.

9. A multimode mobile station configured to implement the steps of the method of claim 1.

10. A non-transitory article of manufacture, comprising:
instructions for causing a programmable multimode mobile station to implement the steps of the method of claim 1; and
a non-transitory machine readable storage medium bearing the instructions.

11. The non-transitory article of manufacture of claim 10, further comprising the first and second lists or tables, wherein the machine readable storage medium also bears the first and second lists or tables.

12. A method of automatic country dependent operation of a mobile station capable of wireless communications in accordance with protocols of at least two different standards, comprising steps of:
in each of a plurality of locations as a user of the mobile station roams, scanning one or more frequencies on which the mobile station expects to find signals of a mobile communication network with which the mobile station may be able to communicate;
from each scanning, acquiring a signal of a respective mobile communication network in an area where the mobile station is operating or intends to operate;
from each acquired network signal, obtaining at least one system identifier of the respective mobile communication network;
for a first country where the obtained at least one system identifier uniquely corresponds to the first country, identifying the first country from a direct mapping of the at least one system identifier to an identification of the first country;
for a second country where the obtained at least one system identifier does not uniquely correspond to the second country, identifying the second country by:
(a) determining a local time (LTM) offset at a current location of the mobile station; and (b) mapping a combination of the at least one system identifier obtained at the current location and the LTM offset to an identification of the second country; and automatically adapting at least one operation of the mobile station responsive to the country identifications.

13. The method of claim 12, wherein:
the at least one system identifier obtained for the first country is a mobile country code (MCC); and
the at least one system identifier obtained for the second country is a system identifier (SID).

14. The method of claim 12, wherein:
the at least one system identifier obtained for the first country is a first system identifier (SID); and
the at least one system identifier obtained for the second country is a second SID.

15. A multimode mobile station configured to implement the steps of the method of claim 12.

16. A non-transitory article of manufacture, comprising:
instructions for causing a programmable multimode mobile station to implement the steps of the method of claim 12; and a non-transitory machine readable storage medium bearing the instructions.

17. A method, in a mobile station capable of wireless communications in accordance with protocols of a code division multiple access (CDMA) protocol and a Third Generation Partnership Project (3GPP) protocol, for determining a country in which the mobile station is operating or intends to operate, the method comprising steps of:
(a) in each of a plurality of locations as a user of the mobile station roams, scanning one or more frequencies on which the mobile station expects to find signals of a mobile communication network with which the mobile station may be able to communicate;
(b) from each scanning, acquiring a signal of a respective mobile communication network in an area where the mobile station is operating or intends to operate;
(c) from each acquired network signal, determining if the acquired signal conforms to the CDMA protocol or the 3GPP protocol and obtaining a system identifier of the respective mobile communication network;
(d) responsive to determining that any acquired signal conforms to the 3GPP protocol, mapping the system identifier of the respective mobile communication network directly to an identification of a country in which the mobile station is operating or intends to operate;
(e) responsive to determining that any acquired signal conforms to the CDMA protocol, determining whether or not the system identifier of the respective mobile communication network is unique;
(f) in a case in which an acquired signal conforms to the CDMA protocol and the system identifier of the respective mobile communication network is unique, mapping the system identifier of the respective mobile communication network directly to an identification of a country in which the mobile station is operating or intends to operate; and
(g) in a case in which an acquired signal conforms to the CDMA protocol and the system identifier of the respective mobile communication network is not unique, determining a local time (LTM) offset at a current location of the mobile station, and mapping a combination of the system identifier of the respective mobile communication network and the LTM offset to an identification of a country in which the mobile station is operating or intends to operate.

18. The method of claim 17, wherein:
the system identifier of the respective mobile communication network in step (e) comprises a mobile country code (MCC) from a 3GG protocol signal;
the system identifier of the respective mobile communication network in step (f) comprises a MCC or a system identifier (SID) from a CDMA protocol signal; and
the system identifier of the respective mobile communication network in step (g) comprises a SID from a CDMA protocol signal.

19. The method of claim 17, wherein the scanning of one or more frequencies involves scanning of frequencies in one or more bands based on a most recently acquired list.

20. The method of claim 19, wherein:
when scanning of frequencies in one or more bands based on a most recently acquired list fails to acquire a signal,
the scanning step further involves scanning of one or more frequencies in one or more bands based on a preference list order.

21. A multimode mobile station configured to implement the steps of the method of claim 17.

22. A non-transitory article of manufacture, comprising:
instructions for causing a programmable multimode mobile station to implement the steps of the method of claim 17; and
a non-transitory machine readable storage medium bearing the instructions.

* * * * *